March 31, 1936.  H. NEHLSEN  2,035,756
ROLLING MILL
Filed Jan. 23, 1935
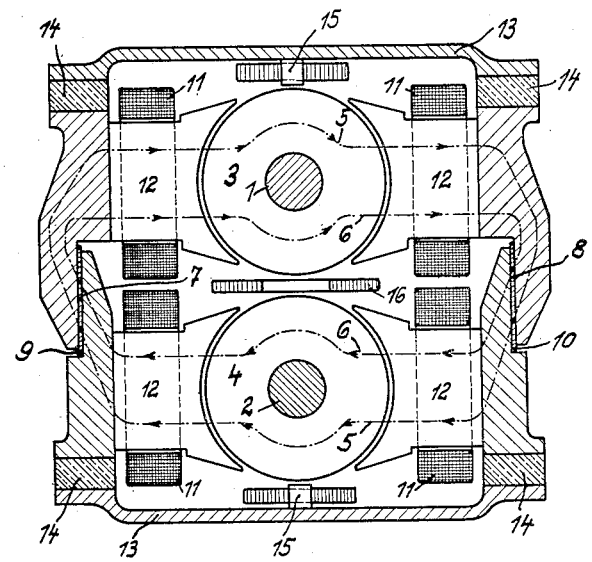
INVENTOR.
BY Hermann Nehlsen
his ATTORNEY.

Patented Mar. 31, 1936

2,035,756

UNITED STATES PATENT OFFICE 2,035,756

ROLLING MILL

Hermann Nehlsen, Dusseldorf-Meererbusch, Germany, assignor to Schloemann Aktiengesellschaft, Dusseldorf, Germany, a corporation of Germany Application January 23, 1935, Serial No. 3,003
In Germany January 21, 1932

2 Claims. (Cl. 172—36)

My invention relates to rolling mills with direct individual drive of the rolls by electric motors, the axes of which are located vertically one above the other, as is the case in rolling mills with overhung rolls supported upon the motor shaft. The space available for each motor in a vertical direction is determined by the distance between the axes of the rolls when they are closest together.

It it were desired to use for driving these rolls the electric motors hitherto known, the rotors of which are surrounded by any system of magnets, in view of the restricted space available, the diameter of the armature could not be made great enough to produce the requisite torques. The lengthening of the armatures in an axial direction is also limited by their liability to deflection.

According to the present invention the space available for each motor in a vertical direction is fully utilized for the rotor diameter, while the magnet system, together with the windings, is exclusively located at the sides of the rotors. The armatures of the two motors are therefore located one above the other, without any parts of the stator being located between them. In this manner the diameters of the rotors can be made so great that sufficiently powerful torques are produced by them. The motor construction in a rolling mill according to the present invention differs from that hitherto usual, involving special constructional forms for the various types of motor, particularly for the stators, which will now be described with reference to the accompanying drawing, in which the single figure shows in sectional elevation, by way of example, a rolling mill according to this invention, driven by two-pole continuous-current motors.

In the drawing, on the shafts 1 and 2 of the rotors 3 and 4, the rolls, which are not shown, are overhung. The magnetic flux, the path of which is indicated by lines 5 and 6, is generated by exciter windings 11, which are mounted upon pole pieces 12. The construction according to this invention is such that the rotors fully occupy the vertical space determined by the minimum vertical distance between the axes of the overhung rolls, while the stators, together with the magnet system, are arranged entirely at the sides of the rotors.

The windings 11 are so arranged that the two rotors are traversed by the same magnetic flux in series with one another, whereby with series connection of the rotor windings the same torques are obtained for both motors. The flux passes from the yoke of the magnet of one motor to that of the other by way of bell-shaped surfaces 7, 8 overlapping one over the other, which serve for the mutual guidance of the two motors while the rolls are adjusted, and are of such length that the entire internal motor structure, even when the rotors are at their maximum distance apart, remains shut off from the outside and protected against dirt. In order that the magnetic reluctances may remain the same on both sides, and furthermore that no sticking may occur owing to remanence, the opposite guiding surfaces are magnetically insulated from one another by sheets 9 and 10 of non-magnetizable material. The passage of the magnetic flux to the casings 13 that bridge over the stator yokes externally is prevented by intervening layers 14 likewise of non-magnetizable material.

With this motor construction only one commutating pole 15 need to be provided for each motor.

For the purpose of compensating for the armature re-actions of the two rotor windings, a single coil 16 is sufficient, since the armature reactions of the two rotors, with the flux following the prescribed course, and with the two rotors rotating in opposite directions, are in the same direction.

I claim as my invention:

1. In a rolling mill of the type described having electric driving motors with superposed rotors; a composite stator for the rotors forming a single common magnetic circuit including each rotor, yoke pieces for the stator and field pole cores attached to the inner faces of each yoke piece; each yoke piece comprising two parts having a step-cut overlapping joint.

2. The combination as specified in claim 1, including casing members bringing over said stator yokes externally being magnetically insulated therefrom.

HERMANN NEHLSEN.